(12) United States Patent
Wang et al.

(10) Patent No.: US 9,584,805 B2
(45) Date of Patent: Feb. 28, 2017

(54) PREDICTION MODE INFORMATION DOWNSAMPLING IN ENHANCED LAYER CODING

(71) Applicant: QUALCOMM Incorporated, San Diego, CA (US)

(72) Inventors: Xianglin Wang, San Diego, CA (US); Vadim Seregin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 13/909,911

(22) Filed: Jun. 4, 2013

(65) Prior Publication Data

US 2013/0329789 A1    Dec. 12, 2013

Related U.S. Application Data

(60) Provisional application No. 61/657,572, filed on Jun. 8, 2012, provisional application No. 61/706,665, filed on Sep. 27, 2012.

(51) Int. Cl.
*H04N 1/00*     (2006.01)
*H04N 19/33*    (2014.01)
(Continued)

(52) U.S. Cl.
CPC ....... *H04N 19/00569* (2013.01); *H04N 19/33* (2014.11); *H04N 19/463* (2014.11); *H04N 19/59* (2014.11); *H04N 19/597* (2014.11)

(58) Field of Classification Search
CPC ...... H04N 19/597; H04N 19/33; H04N 19/59; H04N 19/463; H04N 19/00569
(Continued)

(56) References Cited

U.S. PATENT DOCUMENTS 5,731,850 A * 3/1998 Maturi .................. G06T 7/2026
                                              348/699
8,213,508 B2    7/2012 Boyce et al.
(Continued)

FOREIGN PATENT DOCUMENTS

EP          2479994 A1    7/2012

OTHER PUBLICATIONS

Hong D et al: "Scalability Support in HEVC", 6. JCT-VC Meeting; 97. MPEG Meeting; Jul. 14, 2011-Jul. 22, 2011; Torino; (Joint Collaborative Team on Video Coding of ISO/IEC JTC1/SC29/WG11 and ITU-T SG. 16); URL: http://wftp3.itu.int/av-arch/jctvc-site/, No. JCTVC-F290, Jul. 13, 2011 (Jul. 13, 2011), XP030009313.*

(Continued)

*Primary Examiner* — Jay Patel
*Assistant Examiner* — Marnie Matt
(74) *Attorney, Agent, or Firm* — Knobbe Martens Olson & Bear LLP

(57) ABSTRACT

In one embodiment, a video coder for processing video data includes a processor and a memory. The processor is configured to downsample at least prediction mode information of a reference layer block. In addition, the processor is configured to predict at least one of an enhancement layer block or prediction mode information of the enhancement layer block based at least on the prediction mode information of the reference layer block before the processor downsamples the prediction mode information of the reference layer block. The memory is configured to store the prediction mode information of the reference layer block. The prediction mode information of the reference layer block, for example, includes an inter-prediction mode, an intra-prediction mode, or a motion vector of the reference layer block.

33 Claims, 5 Drawing Sheets

(51) Int. Cl.
 H04N 19/463 (2014.01)
 H04N 19/59 (2014.01)
 H04N 19/597 (2014.01)
 H04N 19/50 (2014.01)
(58) Field of Classification Search
 USPC .................................................. 375/240.12
 See application file for complete search history.

(56) References Cited

U.S. PATENT DOCUMENTS

| | | | |
|---|---|---|---|
| 2006/0008006 A1* | 1/2006 | Cha ...................... | H04N 19/176 375/240.16 |
| 2006/0153300 A1* | 7/2006 | Wang ..................... | H04N 19/56 375/240.16 |
| 2008/0192824 A1 | 8/2008 | Lim et al. | |
| 2009/0010333 A1 | 1/2009 | Tourapis et al. | |
| 2010/0020866 A1* | 1/2010 | Marpe .............. | H04N 19/00569 375/240.02 |
| 2010/0128803 A1* | 5/2010 | Divorra Escoda ... | H04N 19/159 375/240.29 |
| 2012/0057631 A1* | 3/2012 | Le Leannec .......... | H04N 19/56 375/240.16 |
| 2012/0183056 A1 | 7/2012 | He et al. | |
| 2012/0183065 A1 | 7/2012 | Rusert et al. | |

OTHER PUBLICATIONS

Shiodera T et al: "Modified motion vector memory compression", 96. MPEG Meeting; Mar. 21, 2011-Mar. 25, 2011; Geneva; (Motion Picture Expert Group or ISO/IEC JTC1/SC291 WGII), No. m19730, Mar. 16, 2011 (Mar. 16, 2011), XP030048297.*
Hong et at., Scalability Support in HEVC, Jul. 2011, JCT-VC, Joint Collaborative Team on Video Coding of ISO/IEC JTC1/SC29/WG11 and ITU-T SG.16), 6th Meeting, Torino, IT.*
Shiodera et al., Modified motion vector memory compression, Joint Collaborative Team on Video Coding of ITU-T SG16 WP3 and ISO/IEC JTC1/SC29/WG11 5th Meeting, Geneva, CH.*
Hong, et al., "Scalability Support in HEVC," Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F290, pp. 1-15.
Chen J., et al., "Description of scalable video coding technology proposal by Qualcomm (configuration 1)", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG.16); URL:http://wftp3.itu.int/av-arch/jctvc-site/, No. JCTVC-K0035, Oct. 2, 2012 (Oct. 2, 2012), XP030112967, pp. 1-19.
Fukushima S., et al., "Partition size based selection for motion vector compression", 96. MPEG Meeting; Mar. 21, 2011-Mar. 25, 2011; Geneva; (Motion Picture Expert Group or ISO/IEC JTC1/SC29/WG11), No. m19611, Mar. 19, 2011 (Mar. 19, 2011), XP030048178, pp. 1-6.
International Search Repot and Written Opinion—PCT/US2013/044568—ISA/EPO—Sep. 30, 2013.
Shiodera T., et al., "Modified motion vector memory compression", 96. MPEG Meeting; Mar. 21, 2011-Mar. 25, 2011; Geneva; (Motion Picture Expert Group or ISO/IEGJTC1/SC29/WG11), No. m19730, Mar. 16, 2011 (Mar. 16, 2011), XP030048297; pp. 1-7.
Su Y., et al., "CE9: Reduced resolution storage of motion vector data", 4. JCT-VC Meeting; 95. MPEG Meeting; Jan. 20, 2011-Jan. 28, 2011; Daegu; (Joint Collaborative Team on Video Coding of ISO/IEC JTC1/SC29/WG11 and ITU-T SG.16); URL: http://wftp3.itu.int/av-arch/jctvc-site/,,No. JCTVC-D072, Jan. 16, 2011 (Jan. 16, 2011), XP030008112, ISSN: 0000-0015; pp. 1-3.

* cited by examiner

PREDICTION MODE INFORMATION DOWNSAMPLING IN ENHANCED LAYER CODING

CROSS REFERENCE TO RELATED APPLICATIONS

This application claims benefit to U.S. Provisional Patent Application No. 61/657,572 entitled "MOTION INFORMATION DOWNSAMPLING FOR ENHANCED LAYER" filed on Jun. 8, 2012, and U.S. Provisional Patent Application No. 61/706,665 entitled "MOTION INFORMATION DOWNSAMPLING FOR ENHANCED LAYER" filed on Sep. 27, 2012; the disclosures of these applications are hereby incorporated by reference in their entirety.

TECHNICAL FIELD

This disclosure generally relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs), and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which may be quantized. The quantized transform coefficients may be initially arranged in a two-dimensional array and scanned in order to produce a one-dimensional vector of transform coefficients, and entropy coding may be applied to achieve even more compression.

SUMMARY

For purposes of summarizing the disclosure, certain aspects, advantages and novel features have been described herein. It is to be understood that not necessarily all such advantages can be achieved in accordance with any particular embodiment disclosed herein. Thus, the features disclosed herein can be embodied or carried out in a manner that achieves or optimizes one advantage or group of advantages as taught herein without necessarily achieving other advantages as can be taught or suggested herein.

In accordance with some embodiments, a video coder for processing video data includes a processor and a memory. The processor can be configured to downsample at least prediction mode information of a reference layer block, and predict at least one of an enhancement layer block or prediction mode information of the enhancement layer block based at least on the prediction mode information of the reference layer block before the processor downsamples the prediction mode information of the reference layer block. The memory can be configured to store the prediction mode information of the reference layer block.

In some embodiments, a method of processing video data includes: downsampling at least prediction mode information of a reference layer block; and predicting at least one of an enhancement layer block or prediction mode information of the enhancement layer block based at least on the prediction mode information of the reference layer block before said downsampling the prediction mode information of the reference layer block.

In some embodiments, a video coder for processing video data includes: means for downsampling at least prediction mode information of a reference layer block; and means for predicting at least one of an enhancement layer block or prediction mode information of the enhancement layer block based at least on the prediction mode information of the reference layer block before said means for downsampling downsamples the prediction mode information of the reference layer block.

In some embodiments, a non-transitory computer storage that stores executable program instructions that direct a video coder for processing video data to perform a process that includes: downsampling at least prediction mode information of a reference layer block; and predicting at least one of an enhancement layer block or prediction mode information of the enhancement layer block based at least on the prediction mode information of the reference layer block before said downsampling the prediction mode information of the reference layer block.

BRIEF DESCRIPTION OF DRAWINGS

The features of various embodiments disclosed herein are described below with reference to the drawings. Throughout the drawings, reference numbers are re-used to indicate correspondence between referenced elements. The drawings are provided to illustrate embodiments described herein and not to limit the scope thereof.

DETAILED DESCRIPTION

Figure 1:
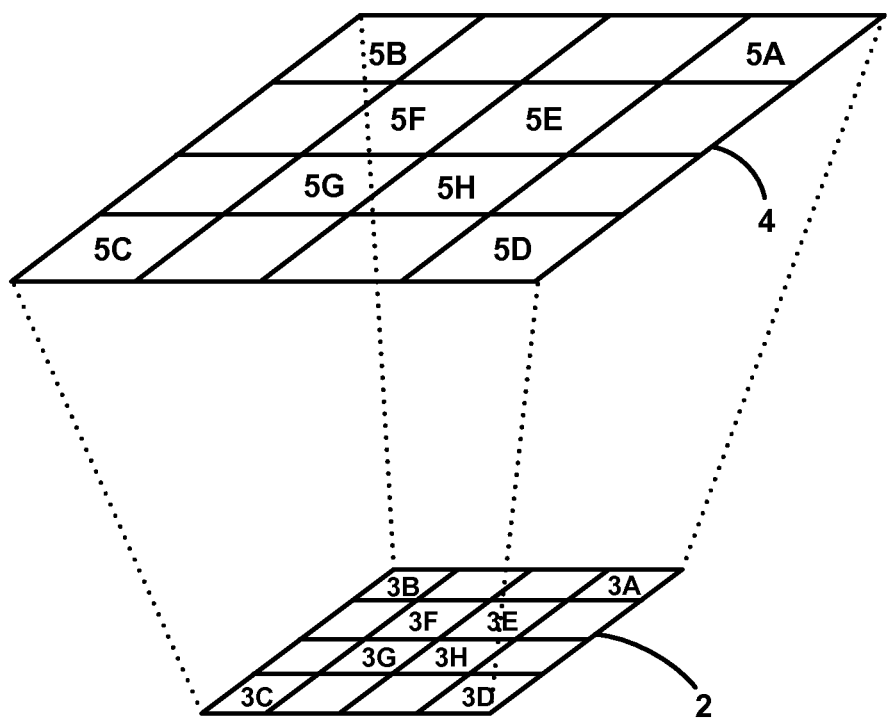
FIG. 1 is a conceptual diagram illustrating an example of blocks in multiple layers in scalable video coding (SVC).

Scalable video coding (SVC) may be used to provide quality or signal-to-noise (SNR) scaling, spatial scaling, and/or temporal scaling. An enhanced layer (EL) may have different spatial resolution than base layer (BL). For example, the spatial aspect ratio between EL and BL can be 1.0, 1.5, 2.0, or other different ratios. In other words, the spatial aspect of the EL may equal 1.0, 1.5, or 2.0 times the spatial aspect of the BL. In some examples, the scaling factor of the EL may be greater than the BL. For example, a size of pictures in the EL may be greater than a size of pictures in the BL. Accordingly, the spatial resolution of the EL can be greater than the spatial resolution of the BL.

In SVC, the information from the base layer (e.g., non-image or prediction mode information such as at least an inter-prediction mode, an intra-prediction mode, a motion vector, a reference index, or reference picture POCs (picture order counts)) may be used for enhanced layer coding. For instance, base layer co-located motion information may be used as a Merge/advanced motion vector prediction (AMVP) candidate, or a resampled base layer, including resampling of the non-image information, can serve as a reference picture for inter prediction of the enhancement layer. Motion information may include the information used to perform inter prediction such as at least motion vector, reference index, and reference picture POC. Resampling or upsampling can be done to match the enhancement layer resolution in some systems prior to use of the reference layer information.

In such systems, prediction mode information including motion information for reference frames can be downsampled to reduce a buffer size and memory bandwidth requirement. For example, the motion information for the reference frames can be downsampled based on a 16×16 block size. For every 16×16 block in a reference frame, one set of motion information can be assigned for an entire 16×16 block regardless of the coding unit size or partition size. As a result, in deriving the co-located motion information at base layer, a fixed location, such as the top left block or pixel within the base layer co-located block, may be selected and its motion information used as co-located motion information from base layer for purposes of predicting the enhanced layer block (e.g., the block in the enhanced layer co-located with the block in the base layer). A motion vector associated with this block in the base layer may be used to form a motion vector prediction for the block in the enhanced layer. One or more base layer motion vectors used for enhanced layer prediction can further be scaled according to the relation or ratio between the base layer resolution and the enhanced layer resolution.

Although information downsampling may not significantly impact coding performance in HEVC where there may be a single layer, it may impact coding performance when applied to SVC where base layer information is used for prediction of enhanced layer information. When a co-located block at the base layer is larger than 4×4, for instance, there can be different motion information associated with each 4×4 area within the co-located block. Base layer motion information, such as motion vector, reference index, or inter direction, can be obtained only from the top left 4×4 block; however, this location may be less optimal than other locations in some instances. When co-located motion information at the base layer may be used for prediction of a current enhanced layer block or motion information of the current enhanced layer block, there can be multiple locations to derive co-located motion information from the base layer. The motion information can be derived, for instance, from a co-located pixel or sub-block in the base layer.

Accordingly, in some embodiments of the present disclosure, the techniques described in this disclosure advantageously utilize prediction mode information including motion information from the base layer block for enhanced layer block predicting and/or for predicting motion information for the enhanced layer block before the base layer motion information is downsampled. In addition, the techniques described in this disclosure can provide multiple pixels or sub-blocks within a base layer block whose motion information may be used for enhanced layer block predicting and/or for predicting the motion information for an enhanced layer block. As a result, more accurate motion information from the base layer can be used to improve the prediction of the enhanced layer block and/or the motion information of the enhanced layer.

Moreover, in some embodiments, the techniques described in this disclosure advantageously utilize prediction mode information, such as a prediction mode or motion information, from a lower level layer (e.g., the base layer) for enhanced layer predicting and/or for predicting the higher level layer (e.g., the enhanced layer) before the prediction mode information is downsampled. For instance, original non-downsampled motion information from the base layer may be used in predicting an enhanced layer slice or picture, enhancement layer block, or the motion information at the enhanced layer.

Downsampling of the base layer motion information may then be performed on a slice, picture, or block level after the motion information is used for prediction of enhanced layer motion information. In some embodiments, the downsampling of prediction mode information for the base layer can be different from the downsampling of prediction mode information for the enhancement layer by varying parameters or filters used in downsampling. For instance, base layer prediction mode information can be downsampled based on 16×16 size blocks, and enhancement layer prediction mode information can be downsampled based on block sizes other than 16×16 size blocks.

The techniques described in this disclosure are generally related to SVC or multiview video coding (MVC). For example, the techniques may be related to, and used with or within, a High Efficiency Video Coding (HEVC) scalable video coding (SVC) extension or multiview/3D video coding (MVC) extension. In SVC, there can be multiple layers. A layer at the very bottom level or lowest level may serve as a base layer (BL) or reference layer, and the layer at the very top may serve as an enhanced layer (EL). In MVC, the term "view" may be used in place of the term "layer." Accordingly, references in this disclosure to "layer" or "layers" may be substituted with "view" or "views," respectively. The "enhanced layer" may be considered as being synonymous with an "enhancement layer," and these terms may be used interchangeably. Layers between the BL and EL may serve as either or both ELs or BLs. For instance, a layer may be an EL for the layers below it, such as the base layer or any intervening enhancement layers, and also serve as a BL for an enhancement layers above it. Moreover, although examples in this disclosure may refer to SVC, the examples can further apply to MVC.

For purposes of illustration, the techniques described in the disclosure are described using examples where there are only two layers. One layer can include a lower level layer or reference layer, and another layer can include a higher level layer or enhancement layer. For example, the reference layer can include a base layer or a temporal reference on an enhancement layer, and the enhancement layer can include an enhanced layer relative to the reference layer. It should be understood that the examples described in this disclosure extend to multiple enhancement layers as well.

Video coding standards can include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its SVC and Multiview Video Coding (MVC) extensions. In addition, High Efficiency Video Coding (HEVC) is currently being developed by the Joint Collaboration Team on Video Coding (JCT-VC) of ITU-T Video Coding Experts Group (VCEG) and ISO/IEC Motion Picture Experts Group (MPEG). Recently, the design of a new video coding standard, namely High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). The latest HEVC draft specification, and referred to as HEVC WD10 hereinafter. The multiview extension to HEVC, namely MV-HEVC, is also being developed by the JCT-3V. A recent Working Draft (WD) of MV-HEVC WD3 hereinafter. The scalable extension to HEVC, named SHVC, is also being developed by the JCT-VC. A recent Working Draft (WD) of SHVC and referred to as SHVC WD1 hereinafter.

FIG. 1 is a conceptual diagram illustrating an example of blocks in multiple layers in SVC. For example, FIG. 1 illustrates a base layer block 2 and an enhanced layer block 4, which may be co-located with one another such that the base layer block 2 can be located at a position in the base layer corresponding to the position of the enhanced layer block 4 in the enhancement layer.

Base layer block 2 includes sub-blocks 3A-3H, and enhanced layer block 4 includes sub-blocks 5A-5H. Each of sub-blocks 3A-3H may be co-located with each of sub-blocks 5A-5H, respectively. For example, each of sub-blocks 3A-3H may correspond to a respective one of sub-blocks 5A-5H. In some coders, the motion information from the top left sub-block (e.g., sub-block 3B) may be used to predict the motion information for enhanced layer block 4. However, this sub-block may be less optimal than other sub-blocks in some instances.

In certain embodiments, an advantage of using non-downsampled motion information of the base layer for enhanced layer coding is that other locations within the co-located base layer block may be distinct, which can enable better or different predictions for EL motion information. For instance, rather than of using the top left 4×4 block or pixel as a location for deriving base layer motion information inside a co-located block (e.g., using sub-block 3B of base layer block 2), other 4×4 block or pixel locations within the co-located base layer block can also be used. For example, it may be desirable to use corners in the top right (e.g., sub-block 3A), bottom left (e.g., sub-block 3C), bottom right (e.g., sub-block 3D), center (e.g., one of sub-blocks 3E, 3F, 3G, 3H), or another of the sub-blocks inside co-located base layer block 2. Furthermore, although the examples describe the sub-blocks to be 4×4, aspects of this disclosure extend to sub-blocks of any other sizes, such as 8×8 and 16×16 or the like.

In some embodiments, the location of the sub-block in the corresponding base layer co-located block can be fixed and/or dependent on one or more factors, such as a largest coding unit (LCU), a coding unit (CU), a prediction unit (PU), transform unit (TU) sizes, an inter direction mode, a partition mode, an amplitude of motion vector or motion vector difference, a reference index, a merge flag, a skip mode, a prediction mode, a physical location of the base and enhanced layer blocks within the pictures, or the like.

In some embodiments, the motion information can be derived jointly from two or more sub-block locations or pixels inside the co-located base layer block, using operations or functions such as an average, weighted average, median, or the like. For example, as shown in FIG. 1, five locations indicated with reference numerals 3A-3H may all be considered and the average or median value of their motion information (e.g., such as average or median values of x and y displacement values of the motion vectors) may be used as the motion information from co-located base layer block in predicting enhanced layer motion information.

Alternatively or additionally, the techniques described in this disclosure can apply when information from the base layer co-located block is used for prediction in coding subsequent blocks in the enhanced layer. For example, reconstructed texture of the base layer can be used as a predictor for the enhanced layer (this mode can be called INTRA_BL or TEXTURE_BL mode). Under this mode, although motion information from a co-located base layer block may not be used for coding the current block at enhanced layer, the information can be inherited and used to populate the motion information of the current block at the enhanced layer and for prediction of motion information of a subsequent block in the enhanced layer, such as for Merge/AMVP list construction. One or more of the techniques mentioned may be applicable in deriving the motion information from base layer. It should be noted that INTRA_BL mode provided here as one example. The techniques described in this disclosure can apply in other scenarios, for example, such as in residual prediction mode or other prediction modes.

In addition to motion information, the techniques described in this disclosure can apply to other type of information (e.g., other prediction mode or non-image information), including an inter-prediction or intra-prediction mode, where the inter-prediction or intra-prediction mode of the co-located base layer block may be inherited and used to predict the corresponding inter-prediction or intra-perdition mode of the enhanced layer block. The corresponding locations may be signaled at LCU/CU/PU level or header, such as slice, sequence, picture headers.

Figure 2:
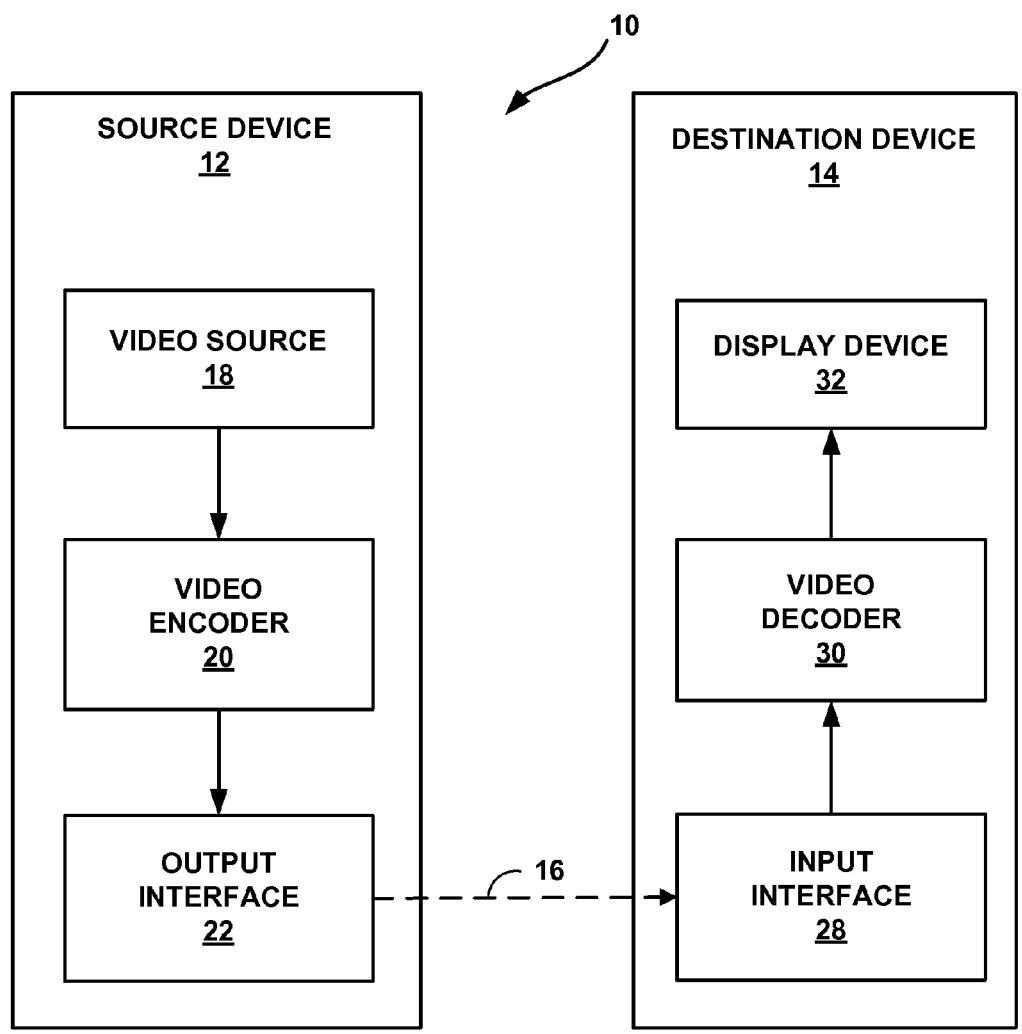
FIG. 2 is a block diagram illustrating an example video encoding and decoding system that may utilize techniques in accordance with aspects of this disclosure.

In some embodiments, a video coder, such as video encoder 20 and video decoder 30 of FIG. 2, may receive non-downsampled, non-image information for a lower level layer block, and perform functions in accordance with one or more embodiments described in this disclosure. Further, the video coder can downsample non-image information of the base layer block. After using the non-image information of the base layer block, the base layer block non-image information can be downsampled to generate prediction information for the base layer that meets conformance requirements of a compression standard. In particular, the base layer may be independently decodable from the enhanced layer. For instance, the base layer is generated so as to be conformant to the HEVC standard so that the base layer can be generated as in HEVC single layer coding. Moreover, in some embodiments, the downsampled base layer prediction information is stored for reference frames.

In some embodiments, a video encoder, such as video encoder 20, can downsample the non-downsampled information for the base layer block. A video decoder, such as video decoder 30, may receive the downsampled information for the base layer block and then upsample the downsampled information. In this manner, the video decoder can receive non-downsampled information for the lower level layer block in some embodiments.

FIG. 2 is a block diagram illustrating an example video encoding and decoding system that may utilize the aspects described in this disclosure. As shown in FIG. 2, system 10 includes a source device 12 that can provide encoded video data to be decoded by a destination device 14. In particular, source device 12 can provide the video data to destination device 14 via a computer-readable medium 16. Source device 12 and destination device 14 may include a wide range of devices, including desktop computers, notebook (i.e., laptop) computers, tablet computers, set-top boxes, telephone handsets, such as so-called "smart" phones, so-called "smart" pads, televisions, cameras, display devices, digital media players, video gaming consoles, video streaming device, or the like. Source device 12 and destination device 14 may be equipped for wireless communication.

Destination device 14 may receive the encoded video data to be decoded via computer-readable medium 16. Computer-readable medium 16 may comprise a type of medium or device capable of moving the encoded video data from source device 12 to destination device 14. For example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network, such as the Internet. The communication medium may include routers, switches, base stations, or other equipment that may be useful to facilitate communication from source device 12 to destination device 14.

In some embodiments, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or other digital storage media for storing video data. The storage device may correspond to a file server or another intermediate storage device that may store the encoded video generated by source device 12. Destination device 14 may access stored video data from the storage device via streaming or download. The file server may be a type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through a standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure can apply applications or settings in addition to wireless applications or settings. The techniques may be applied to video coding in support of a of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some embodiments, system 10 may be configured to support one-way or two-way video transmission to support applications such as video streaming, video playback, video broadcasting, and/or video telephony.

In FIG. 2, source device 12 includes video source 18, video encoder 20, and output interface 22. Destination device 14 includes input interface 28, video decoder 30, and display device 32. Video encoder 20 of source device 12 may be configured to apply the techniques for coding a bitstream including video data conforming to multiple standards or standard extensions. In other embodiments, a source device and a destination device may include other components or arrangements. For example, source device 12 may receive video data from an external video source 18, such as an external camera. Likewise, destination device 14 may interface with an external display device, rather than including an integrated display device.

System 10 of FIG. 2 is one example system, and techniques for determining candidates for a candidate list for motion vector predictors for a current block may be performed by other digital video encoding and/or decoding devices. Although generally the techniques of this disclosure can be performed by a video encoding device, the techniques can be performed by a video encoder/decoder, typically referred to as a "CODEC." Moreover, the techniques of this disclosure can be performed by a video preprocessor. Source device 12 and destination device 14 are examples of such coding devices in which source device 12 generates coded video data for transmission to destination device 14. In some embodiments, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. Video source 18 may generate computer graphics-based data as the source video, or a combination of live video, archived video, and computer-generated video. In some embodiments, if video source 18 is a video camera, source device 12 and destination device 14 may form so-called camera phones or video phones. The captured, pre-captured, or computer-generated video may be encoded by video encoder 20. The encoded video information may be output by output interface 22 to a computer-readable medium 16.

Computer-readable medium 16 may include transient media, such as a wireless broadcast or wired network transmission, or storage media (e.g., non-transitory storage media), such as a hard disk, flash drive, compact disc, digital video disc, Blu-ray disc, or other computer-readable media. A network server (not shown) may receive encoded video data from source device 12 and provide the encoded video data to destination device 14 (e.g., via network transmission). A computing device of a medium production facility, such as a disc stamping facility, may receive encoded video data from source device 12 and produce a disc containing the encoded video data. Therefore, computer-readable medium 16 may be understood to include one or more computer-readable media of various forms.

Input interface 28 of destination device 14 can receive information from computer-readable medium 16. The information of computer-readable medium 16 may include syntax information defined by video encoder 20, which can be used by video decoder 30, that includes syntax elements that describe characteristics and/or processing of blocks and other coded units, e.g., GOPs. Display device 32 displays the decoded video data to a user, and may include any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards, or the like. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 and video decoder 30 typically operate on video blocks within individual video slices in order to encode the video data and decode video data, respectively. A video block may correspond to a coding node within a CU. The video blocks may have fixed or varying sizes, and may differ in size according to a specified coding standard. In some implementations, video encoder 20 and video decoder 30 additionally or alternatively operate on individual video slices or pictures in order to encode the video data or decode video data, respectively.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

In accordance with the techniques of this disclosure, source device 12 and destination device 14 may be configured to receive original, non-downsampled information for a lower level layer block (e.g., a base layer block), and predict information for a higher level layer block (e.g., an enhanced layer block) based on the original, non-downsampled information for the lower level layer block. In some embodiments, after predicting the information for the higher level layer block, source device 12 may downsample the information for the lower level layer block. Moreover, in further embodiments, destination device 14 may receive the downsampled information for the lower level layer block from source device 12. Destination device 14 can upsample the downsampled information to produce the non-downsampled information for the lower level layer block.

Source device 12 and destination device 14 may determine a location of a sub-block within the lower level layer block, and derive information from the sub-block within the lower level block. In this example, source device 12 and destination device 14 may predict information for the higher level layer block based on the derived information. The information may be motion information, intra-prediction mode, or other types of information, for example, such as prediction mode or non-image information associated with blocks. The motion information may include motion vector, reference index, and inter direction information, or the like.

In some examples, source device 12 and destination device 14 may derive information from a plurality of sub-blocks within the lower level layer block. Source device 12 and destination device 14 may predict information for the higher level layer block based on the derived information, which can be from the plurality of sub-blocks within the lower level layer block.

The information for the lower layer block and higher layer block may include at least one of motion information and intra-prediction mode, although additional information can be included. The higher level layer block may be co-located with the lower level layer block. In some embodiments, the higher level block may be subsequent to the lower level layer block in a coding order.

Figure 3:
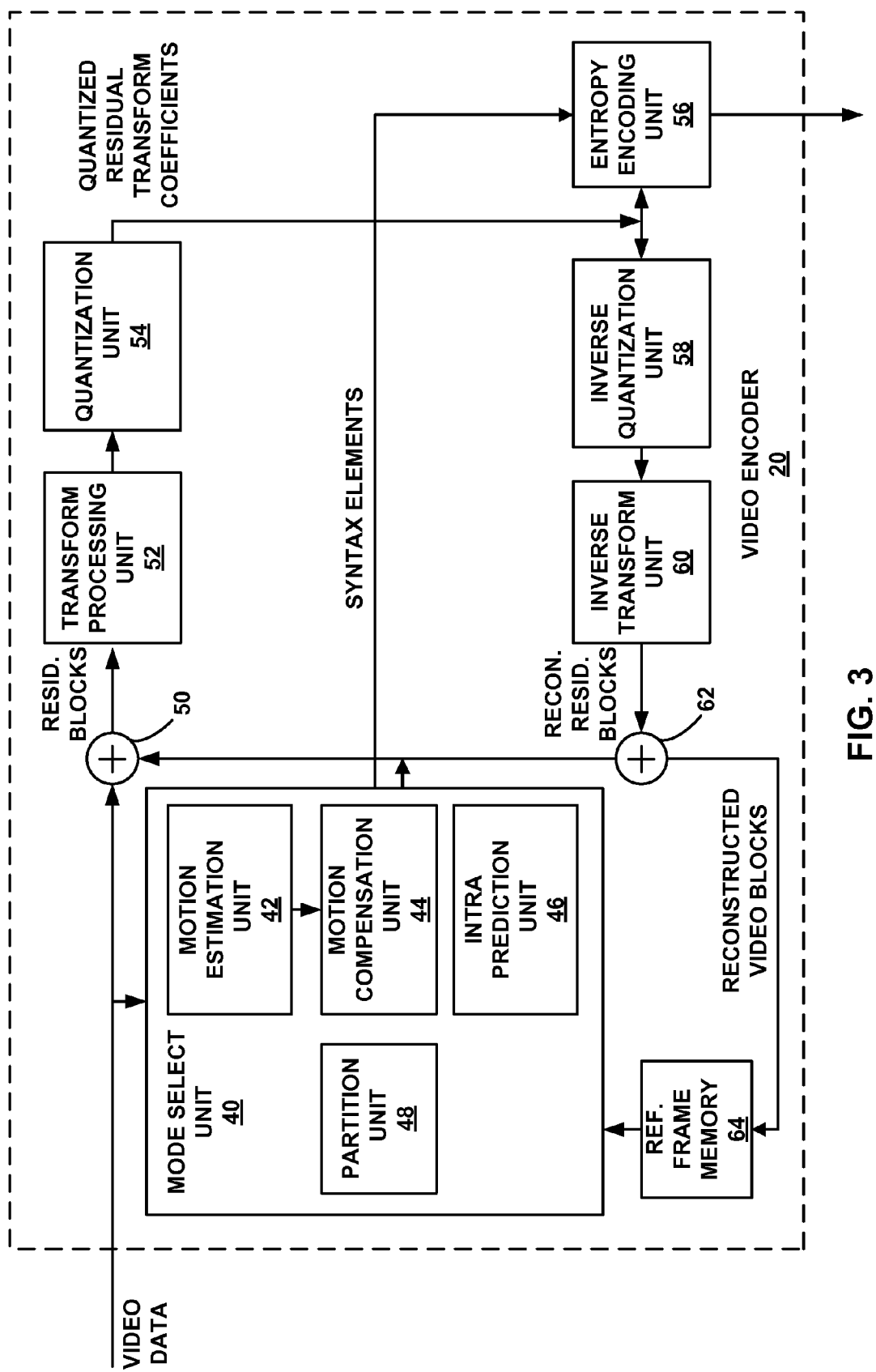
FIG. 3 is a block diagram illustrating an example of a video encoder that may implement techniques in accordance with aspects of this disclosure.

FIG. 3 is a block diagram illustrating an example of a video encoder that may implement aspects described in this disclosure. Video encoder 20 may be configured to perform any or all of the techniques of this disclosure. As one example, mode select unit 40 including motion estimation unit 42 and intra-prediction unit 46 may be configured to perform any or all of the techniques described in this disclosure. However, aspects of this disclosure are not so limited. In some examples, the techniques described in this disclosure may be shared among the various components of video encoder 20, including reference frame memory 64.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 3, video encoder 20 receives a current video block within a video frame to be encoded. In the example of FIG. 2, video encoder 20 includes mode select unit 40, reference frame memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 3) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 can be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. In some embodiments, motion estimation unit 42 determines the motion vector using non-downsampled information and subsequently downsamples the information. The non-downsampled information can be buffered or stored in a local memory of motion estimation unit 42 during processing. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In some embodiments, motion estimation unit 42 can perform motion estimation relative to luma components, and motion compensation unit 44 can use motion vectors calculated based on the luma components for both chroma components and luma components. Mode select unit 40 may generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, in some embodiments. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes. In some embodiments, intra-prediction unit 46 determines the intra-prediction mode using non-downsampled information and subsequently downsamples the information. The non-downsampled information can be buffered or stored in a local memory of intra-prediction unit 46 during processing.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms can also be used. Transform processing unit 52 can apply the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain (e.g., for later use as a reference block). Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Although FIG. 3 illustrates that operations of video encoder 20 can be performed on the level of individual video blocks, video encoder 20 can, in some embodiments, implement the techniques in this disclosure on the level of individual video slices or pictures. In such cases, slice or picture level prediction mode information, for instance, can be stored in reference frame memory 64. The slice or picture level prediction mode information can be input to mode select unit 40 and used to encode blocks of a slice or picture. After encoding the blocks of the slice or picture, the slice or picture level prediction mode information may be downsampled by video encoder 20.

Figure 4:
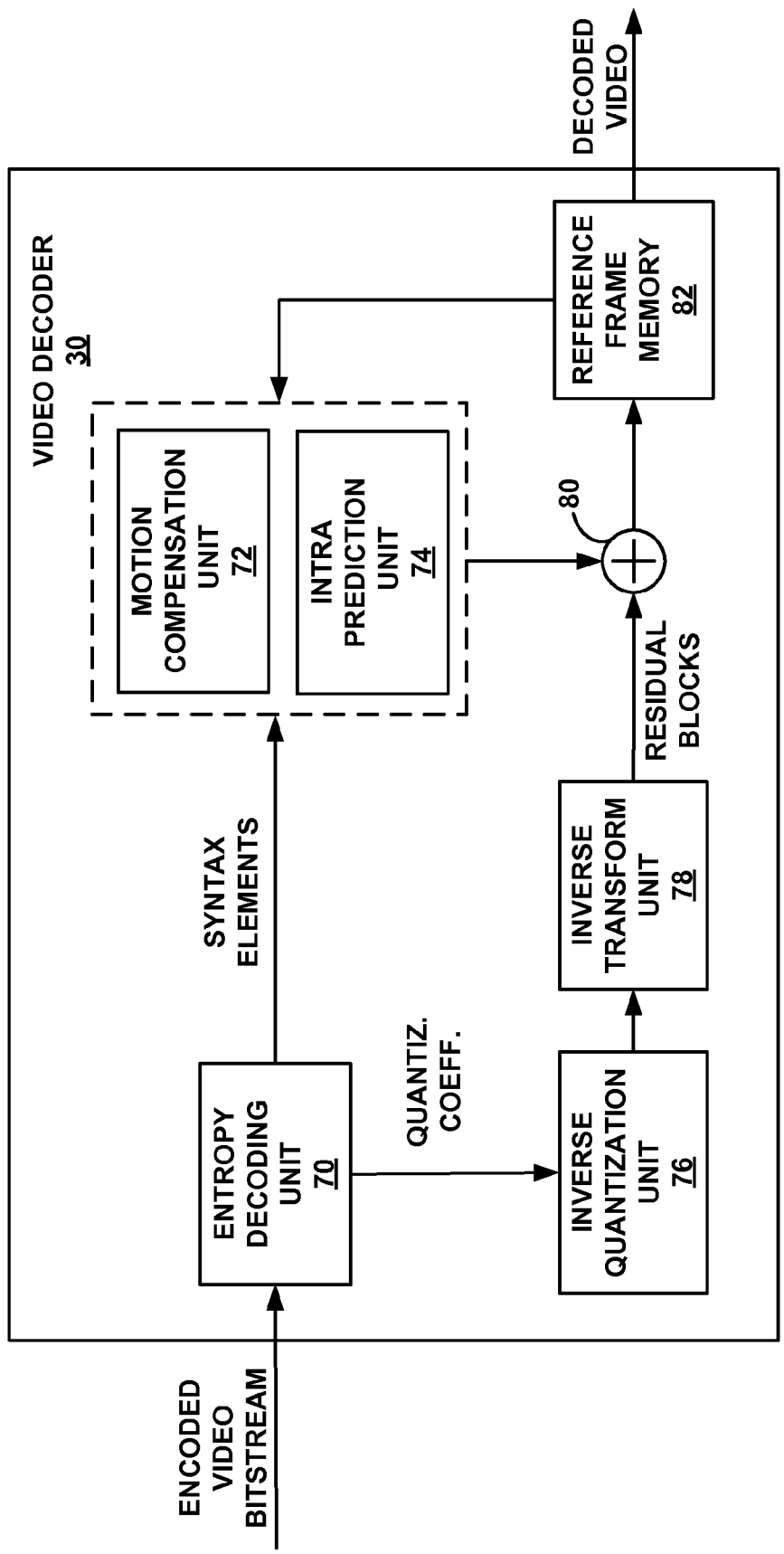
FIG. 4 is a block diagram illustrating an example of a video decoder that may implement techniques in accordance with aspects of this disclosure.

FIG. 4 is a block diagram illustrating an example of a video decoder that may implement aspects described in this disclosure. Video decoder 30 may be configured to perform any or all of the techniques of this disclosure. As one example, motion compensation unit 72 and intra prediction unit 74 may be configured to perform any or all of the techniques described in this disclosure. However, aspects of this disclosure are not so limited. In some examples, the techniques described in this disclosure may be shared among the various components of video decoder 30, including reference frame memory 82.

In the example of FIG. 4, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 3). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. In some embodiments, intra prediction unit 74 determines the prediction data using non-downsampled information and subsequently downsamples the information. The non-downsampled information can be buffered or stored in a local memory of intra prediction unit 74 during processing. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 92. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice. In some embodiments, motion compensation unit 72 uses non-downsampled information for prediction and subsequently downsamples the information. The non-downsampled information can be buffered or stored in a local memory of motion compensation unit 72 during processing.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., dequantizes, the quantized transform coefficients provided in the bitstream and decoded by entropy decoding unit 80. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference frame memory 82 also stores decoded video for later presentation on a display device, such as display device 32 of FIG. 2.

Although FIG. 4 illustrates that operations of video decoder 30 can be performed on the level of individual video blocks, video decoder 30 can, in some embodiments, implement the techniques in this disclosure on the level of individual video slices or pictures. In such cases, slice or picture level prediction mode information, for instance, can be stored in reference frame memory 82. The slice or picture level prediction mode information can be input to motion compensation unit 72 and intra prediction unit 74 and used to decode blocks of a slice or picture. After decoding the blocks of the slice or picture, the slice or picture level prediction mode information may be downsampled by video decoder 30.

Figure 5:
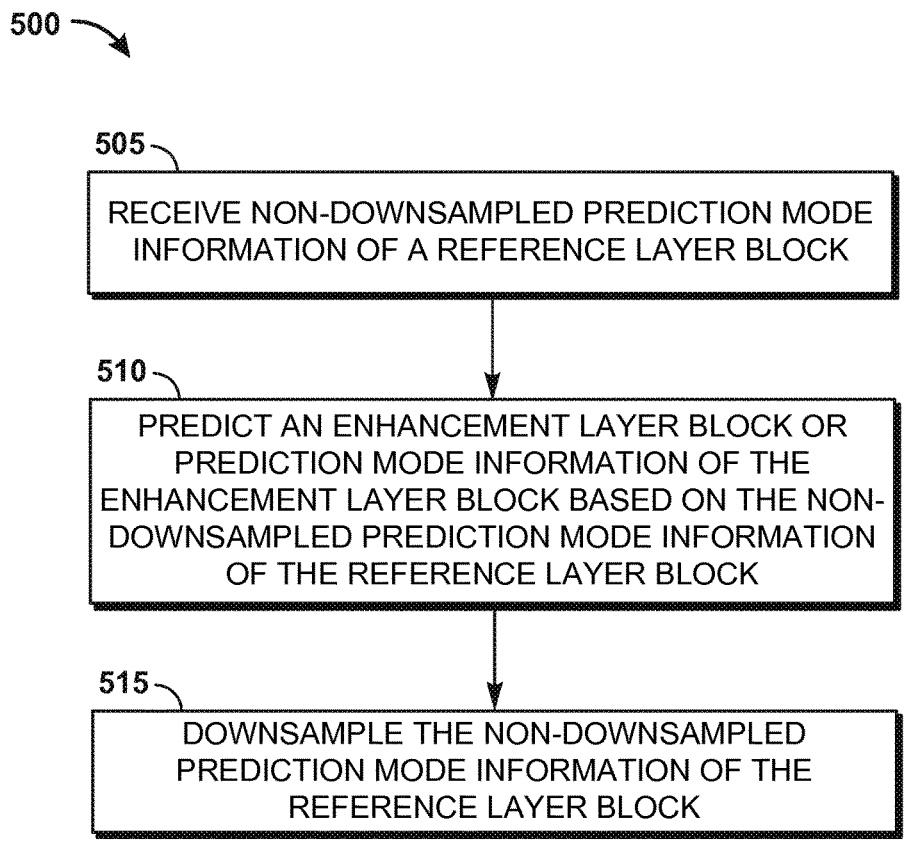
FIG. 5 illustrates an example method for coding video data.

FIG. 5 illustrates an example method 500 for coding video data. The method 500 can be performed by one or more components of video encoder 20 or video decoder 30, for example. In some embodiments, other components may be used to implement one or more of the steps described herein.

At node 505, non-downsampled prediction mode information of a reference layer block can be determined or received from a memory. The non-downsampled prediction mode information of the reference layer block can include an inter-prediction or intra-prediction mode of the reference layer block, motion information of the reference layer block, and other parameters used to describe the behavior of the prediction modes of the reference layer block. For example, the non-downsampled prediction mode information of the reference layer block can be determined by motion estimation unit 42, intra-prediction unit 46, motion compensation unit 72, or intra prediction unit 74. In another example, the non-downsampled prediction mode information of the reference layer block can be received from reference frame memory 64 or reference frame memory 82.

At node 510, at least one of an enhancement layer block or prediction mode information of the enhancement layer block can be predicted based on the non-downsampled prediction mode information of the reference layer block. The prediction mode information of the enhancement layer block can include an inter-prediction or intra-prediction mode of the enhancement layer block, motion information of the enhancement layer block, or other parameters used to describe the behavior of the prediction modes of the enhancement layer block. For example, the enhancement layer block or prediction mode information of the enhancement layer block can be predicted by motion estimation unit 42, intra-prediction unit 46, motion compensation unit 72, or intra prediction unit 74.

At node 515, at least the non-downsampled prediction mode information of the reference layer block can be downsampled, for example, to generate information for predicting the reference layer block. Downsampling can be performed on a slice, picture, or block level by video encoder 20 or video decoder 30. For instance, the non-downsampled prediction mode information of the reference layer block can be downsampled by motion estimation unit 42, intra-prediction unit 46, motion compensation unit 72, or intra prediction unit 74. In some embodiments, the non-downsampled prediction mode information of the reference layer block can be downsampled after predicting the at least one of the enhancement layer block or the prediction mode information of the enhancement layer block.

Figure 6:
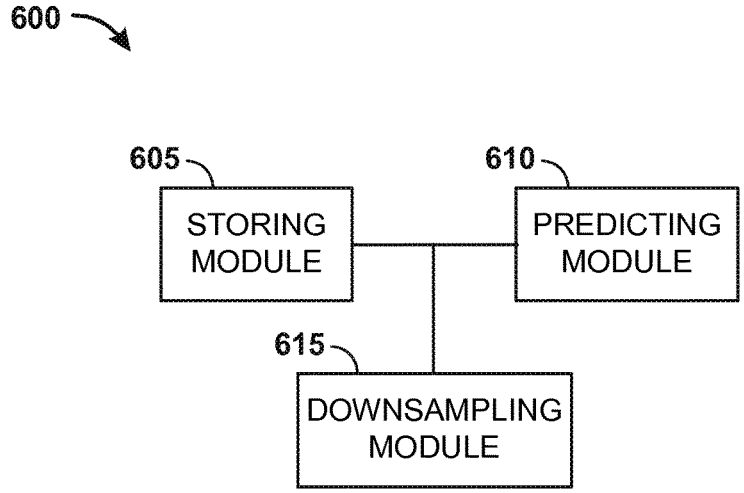
FIG. 6 is a functional block diagram of an example video coder.

FIG. 6 is a functional block diagram of an example video coder 600. Video coder 600 includes storing module 605, predicting module 610, and downsampling module 615. One or more components of video encoder 20 or video decoder 30 can be used to implement storing module 605, predicting module 610, and downsampling module 615. In some embodiments, other components may be used to implement one or more of the modules.

Storing module 605 can store non-downsampled prediction mode information of a reference layer block. The non-downsampled prediction mode information of the reference layer block can include an inter-prediction or intra-prediction mode of the reference layer block or motion information of the reference layer block, for instance. Predicting module 610 can obtain the non-sampled prediction mode information from the storing module 605 and predict at least one of the enhancement layer block or prediction mode information of the enhancement layer block based on the non-downsampled prediction mode information of the reference layer block. The prediction mode information of the enhancement layer block can include at least one of an inter-prediction or intra-prediction mode of the enhancement layer block or motion information of the enhancement layer block, for example. Downsampling module 615 can at least downsample the non-downsampled prediction mode information of the reference layer block.

In some embodiments, means for storing non-downsampled prediction mode information of a reference layer block comprise storing module 605. Further, in some embodiments, means for predicting at least one of the enhancement layer block or prediction mode information of the enhancement layer block based on the non-downsampled prediction mode information of the reference layer block comprise predicting module 610. In some embodiments, means for downsampling the non-downsampled prediction mode information of the reference block comprise downsampling module 615.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques can be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware. Various examples have been described. These and other examples are within the scope of the following claims.

What is claimed is:

1. A video coder for processing video data, the video coder comprising:
 a processor configured to:
  receive non-downsampled prediction mode information of a reference layer block;
  derive prediction mode information of the enhancement layer block based at least on the received non-downsampled prediction mode information of the reference layer block, the received non-downsampled prediction mode information including prediction mode information associated with a first sub-block of the reference layer block and prediction mode information associated with a second sub-block of the reference layer block; and
  downsample the received non-downsampled prediction mode information after the prediction mode information of the enhancement layer block is derived, the downsampled prediction mode information being based on the received non-downsampled prediction mode information associated with a plurality of sub-blocks of the reference layer block, the plurality of sub-blocks of the reference layer block including at least one of the first sub-block of the reference layer block, the second sub-block of the reference layer block or other sub-blocks of the reference layer block; and
 a memory configured to store the received non-downsampled prediction mode information of the reference layer block.

2. The video coder of claim 1, wherein the processor is further configured to store the downsampled prediction mode information of the reference layer block as reference frame data in the memory.

3. The video coder of claim 1, wherein the processor is further configured to derive the prediction mode information of the reference layer block from prediction mode information of a sub-block from the plurality of sub-blocks of the reference layer block.

4. The video coder of claim 3, wherein the processor is further configured to determine the sub-block of the reference layer block based on at least one of a largest coding unit (LCU) size, a coding unit (CU) size, a prediction unit (PU) size, a transform unit (TU) size, an inter-direction mode, a partition mode, an amplitude of motion vector, a motion vector difference, a reference index, a merge flag, a skip mode, a prediction mode, and a physical location of one reference layer block and one enhancement layer block within pictures.

5. The video coder of claim 1, wherein the processor is further configured to derive the prediction mode information of the reference layer block from the plurality of sub-blocks of the reference layer block.

6. The video coder of claim 5, wherein the processor is further configured to derive the prediction mode information of the reference layer block from the plurality of sub-blocks based on an average of sub-block information or a median of the sub-block information, the sub-block information comprising prediction mode information of the plurality of sub-blocks.

7. The video coder of claim 1, wherein the prediction mode information of the reference layer block comprise motion information of the reference layer block, the motion information comprising at least one of a motion vector or a reference index.

8. The video coder of claim 7, wherein the processor is further configured to store the motion information as a candidate in an enhancement layer Merge/AMVP candidate list.

9. The video coder of claim 1, wherein the prediction mode information of the reference layer block comprise an intra-prediction mode of the reference layer block.

10. The video coder of claim 1, wherein the reference layer block is located at a position in a reference layer corresponding to the position of the enhancement layer block in an enhancement layer.

11. The video coder of claim 1, wherein the processor comprises a decoder.

12. The video coder of claim 1, wherein the processor comprises an encoder.

13. The video coder of claim 1, wherein the video coder is part of a device, the device selected from the group consisting of a desktop computer, a notebook computer, a tablet computer, a set-top box, a telephone handset, a television, a camera, a display device, a digital media player, a video gaming console, and a video streaming device.

14. A method of processing video data, the method comprising:
receiving non-downsampled prediction mode information of a reference layer block;
deriving prediction mode information of the enhancement layer block based at least on the received non-downsampled prediction mode information of the reference layer block, the received non-downsampled prediction mode information including prediction mode information associated with a first sub-block of the reference layer block and prediction mode information associated with a second sub-block of the reference layer block; and
downsampling the received non-downsampled prediction mode information after the deriving the prediction mode information of the enhancement layer block, the downsampled prediction mode information being based on the received non-downsampled prediction mode information associated with a plurality of sub-blocks of the reference layer block, the plurality of sub-blocks of the reference layer block including at least one of the first sub-block of the reference layer block, the second sub-block of the reference layer block or other sub-blocks of the reference layer block.

15. The method of claim 14, further comprising storing the downsampled prediction mode information of the reference layer block as reference frame data.

16. The method of claim 14, further comprising deriving the prediction mode information of the reference layer block from prediction mode information of a sub-block from the plurality of sub-blocks of the reference layer block.

17. The method of claim 16, further comprising determining the sub-block of the reference layer block based on at least one of a largest coding unit (LCU) size, a coding unit (CU) size, a prediction unit (PU) size, a transform unit (TU) size, an inter-direction mode, a partition mode, an amplitude of motion vector, a motion vector difference, a reference index, a merge flag, a skip mode, a prediction mode, and a physical location of one reference layer block and one enhancement layer block within pictures.

18. The method of claim 14, further comprising deriving the prediction mode information of the reference layer block from the plurality of sub-blocks of the reference layer block.

19. The method of claim 18, wherein said deriving the prediction mode information of the reference layer block comprises deriving the prediction mode information of the reference layer block from the plurality of sub-blocks based on an average of sub-block information or a median of the sub-block information, the sub-block information comprising prediction mode information of the plurality of sub-blocks.

20. The method of claim 14, wherein the prediction mode information of the reference layer block comprise motion information of the reference layer block, the motion information comprising at least one of a motion vector or a reference index.

21. The method of claim 20, further comprising storing the motion information as a candidate in an enhancement layer Merge/AMVP candidate list.

22. The method of claim 14, wherein the prediction mode information of the reference layer block comprise an intra-prediction mode of the reference layer block.

23. The method of claim 14, wherein the reference layer block is located at a position in a reference layer corresponding to the position of the enhancement layer block in an enhancement layer.

24. The method of claim 14, further comprising receiving a syntax element extracted from an encoded video bit stream, the syntax element comprising the prediction mode information of the reference layer block.

25. The method of claim 14, further comprising generating a syntax element for an encoded video bit stream based on the prediction mode information of the reference layer block.

26. A video coder for processing video data, the video coder comprising:
means for receiving non-downsampled prediction mode information of a reference layer block;
means for deriving prediction mode information of the enhancement layer block based at least on the received non-downsampled prediction mode information of the reference layer block, the received non-downsampled prediction mode information including prediction mode information associated with a first sub-block of the reference layer block and prediction mode information associated with a second sub-block of the reference layer block; and
means for downsampling the received non-downsampled prediction mode information after the prediction mode information of the enhancement layer block is derived, the downsampled prediction mode information being based on the received non-downsampled prediction mode information associated with a plurality of sub-blocks of the reference layer block, the plurality of sub-blocks of the reference layer block including at least one of the first sub-block of the reference layer block, the second sub-block of the reference layer block or other sub-blocks of the reference layer block.

27. The video coder of claim 26, further comprising means for deriving the prediction mode information of the reference layer block from prediction mode information of a sub-block from the plurality of sub-blocks of the reference layer block, the sub-block of the reference layer block determined based on at least one of a largest coding unit (LCU) size, a coding unit (CU) size, a prediction unit (PU) size, a transform unit (TU) size, an inter-direction mode, a partition mode, an amplitude of motion vector, a motion vector difference, a reference index, a merge flag, a skip mode, a prediction mode, and a physical location of one reference layer block and one enhancement layer block within pictures.

28. The video coder of claim 26, wherein the prediction mode information of the reference layer block comprise motion information of the reference layer block, the motion information comprising at least one of a motion vector or a reference index.

29. The video coder of claim 26, wherein the prediction mode information of the reference layer block comprise an intra-prediction mode of the reference layer block.

30. A non-transitory computer storage that stores executable program instructions that direct a video coder for processing video data to perform a process that comprises:
    receiving non-downsampled prediction mode information of a reference layer block;
    deriving prediction mode information of the enhancement layer block based at least on the received non-downsampled prediction mode information of the reference layer block, the received non-downsampled prediction mode information including prediction mode information associated with a first sub-block of the reference layer block and prediction mode information associated with a second sub-block of the reference layer block; and
    downsampling the received non-downsampled prediction mode information after the prediction mode information of the enhancement layer block is derived, the downsampled prediction mode information being based on the received non-downsampled prediction mode information associated with a plurality of sub-blocks of the reference layer block, the plurality of sub-blocks of the reference layer block including at least one of the first sub-block of the reference layer block, the second sub-block of the reference layer block or other sub-blocks of the reference layer block.

31. The non-transitory computer storage of claim 30, wherein the process further comprises deriving the prediction mode information of the reference layer block from prediction mode information of a sub-block from the plurality of sub-blocks of the reference layer block, the sub-block of the reference layer block determined based on at least one of a largest coding unit (LCU) size, a coding unit (CU) size, a prediction unit (PU) size, a transform unit (TU) size, an inter-direction mode, a partition mode, an amplitude of motion vector, a motion vector difference, a reference index, a merge flag, a skip mode, a prediction mode, and a physical location of one reference layer block and one enhancement layer block within pictures.

32. The non-transitory computer storage of claim 30, wherein the prediction mode information of the reference layer block comprise motion information of the reference layer block, the motion information comprising at least one of a motion vector or a reference index.

33. The non-transitory computer storage of claim 30, wherein the prediction mode information of the reference layer block comprise an intra-prediction mode of the reference layer block.

* * * * *